(12) United States Patent
Komatsu

(10) Patent No.: US 9,508,153 B2
(45) Date of Patent: Nov. 29, 2016

(54) DISTANCE MEASUREMENT APPARATUS, IMAGING APPARATUS, DISTANCE MEASUREMENT METHOD, AND PROGRAM

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 14/593,182

(22) Filed: Jan. 9, 2015

(65) Prior Publication Data

US 2015/0227815 A1 Aug. 13, 2015

(30) Foreign Application Priority Data

Feb. 7, 2014 (JP) .................................. 2014-022059

(51) Int. Cl.
*G06K 9/00* (2006.01)
*G06T 7/00* (2006.01)

(52) U.S. Cl.
CPC .......... *G06T 7/0065* (2013.01); *G06T 7/0069* (2013.01); *G06K 9/00228* (2013.01); *G06T 2207/10148* (2013.01)

(58) Field of Classification Search
None
See application file for complete search history.

(56) References Cited

U.S. PATENT DOCUMENTS

| 8,213,744 B2 | 7/2012 | Yano | |
|---|---|---|---|
| 2007/0014449 A1* | 1/2007 | Morns | G06F 19/24 382/128 |
| 2007/0076954 A1* | 4/2007 | Terakawa | G06K 9/00248 382/190 |
| 2010/0067820 A1 | 3/2010 | Yano | |
| 2010/0104197 A1* | 4/2010 | Sohma | G06F 17/30277 382/195 |
| 2010/0309225 A1* | 12/2010 | Gray | G06F 17/30247 345/633 |
| 2014/0210999 A1 | 7/2014 | Komatsu | |
| 2015/0042839 A1 | 2/2015 | Komatsu et al. | |

FOREIGN PATENT DOCUMENTS

| JP | 085370 A | 1/1996 |
|---|---|---|
| JP | 2008293185 A | 12/2008 |

OTHER PUBLICATIONS

U.S. Appl. No. 14/617,972, filed Feb. 10, 2015; Inventor, Satoru Komatsu.
U.S. Appl. No. 14/406,866, filed Dec. 10, 2014; Inventor, Satoru Komatsu.
Satoru Komatsu, U.S. Appl. No. 14/617,972, filed Feb. 10, 2015.
Satoru Komatsu, U.S. Appl. No. 14/406,866, filed Dec. 10, 2014.

* cited by examiner

*Primary Examiner* — Hadi Akhavannik
(74) *Attorney, Agent, or Firm* — Fitzpatrick, Cella, Harper & Scinto

(57) ABSTRACT

A distance measurement apparatus that calculates distance information based on first and second images, includes a first calculation unit that calculates, for each pixel to which distance calculation is performed, distance information corresponding to the pixel on the basis of a local area of a number of local areas in the first image, including the pixel, and a local area of a number of local areas in the second image, corresponding to the local area in the first image; a second calculation unit that calculates a non-similarity value between the local area in the first image and the local area in the second image; a determination unit that determines whether the non-similarity value is greater than a threshold; and a third calculation unit that calculates a ratio of the number of local areas for which the non-similarity value is determined to be greater than the threshold in a predetermined area to the number of local areas in the predetermined area.

17 Claims, 9 Drawing Sheets

DISTANCE MEASUREMENT APPARATUS, IMAGING APPARATUS, DISTANCE MEASUREMENT METHOD, AND PROGRAM

BACKGROUND OF THE INVENTION

1. Field of the Invention

The present invention relates to a distance measurement technique, and in particular, to a technique for determining whether a distance image has been correctly calculated.

2. Description of the Related Art

Techniques are conventionally proposed which involve estimating a distance based on a plurality of captured images using a stereo method, a depth from defocus (DFD) method, a depth from focus (DFF) method, or the like, to generate a distance image. The stereo method is a technique for calculating a distance using parallaxes of corresponding places in a plurality of images captured at different viewpoints, based on the principle of triangulation. The DFD method and the DFF method are techniques for calculating distances based on variations in blur in a plurality of images captured with different image capturing parameters. The distance image generated by these techniques contains an error resulting from various factors, leading to degraded quality of an application that utilizes the distance image. In particular, if an object that is moving (hereinafter referred to as a moving object) is present or camera shake occurs when a plurality of images are consecutively captured at different points in time, the distance is calculated with no corresponding images among the captured images or calculated based on misaligned images. This prevents the correct value from being obtained.

To deal with such a problem with the distance calculation, Japanese Patent Application Laid-open No. H08-005370 has been proposed as a technique for detecting an area for which the distance has not been successfully correctly calculated. According to Japanese Patent Application Laid-open No. H08-005370, a contrast in an area in an image for which distances are to be calculated is detected, and when the contrast is low, an output indicating that the distance for the area is indefinite is provided.

Furthermore, Japanese Patent Application Laid-open No. 2008-293185 discloses a technique for detecting an error in alignment when a plurality of images is synthesized. Japanese Patent Application Laid-open No. 2008-293185 proposes a method of performing measurement of a frequency characteristic afterimage synthesis to detect an error in an alignment process based on the measured frequency characteristic.

Patent Literature 1: Japanese Patent Application Laid-open No. H08-005370

Patent Literature 2: Japanese Patent Application Laid-open No. 2008-293185

SUMMARY OF THE INVENTION

As is known, when occlusion or misalignment is present among a plurality of captured images, distance information determined using the captured images based on the stereo method, the DFD method, or the DFF method may suffer a distance estimation error.

According to Japanese Patent Application Laid-open No. H08-005370, the indefinite-distance area is detected based only on the contrast in one image, thus preventing detection of an indefinite-distance area resulting from occlusion or misalignment between two images.

According to Japanese Patent Application Laid-open No. 2008-293185, an error in alignment is detected by calculating the frequency characteristic using an image resulting from synthesis after the alignment process executed on the plurality of images. If a similar technique is applied to the DFD method or the DFF method, misdetection may occur. This is because the DFD method and the DFF method use a plurality of images with different blurs and because the images with the different blurs differ in frequency characteristic even when the images are aligned with one another.

With the above-described problems in view, it is an object of the present invention to provide a technique for detecting an area for which distances are not successfully correctly performed, to enable determination of whether the distance has been correctly estimated.

A first aspect of the present invention is a distance measurement apparatus that calculates distance information based at least on a first image and a second image, the distance measurement apparatus comprising: a first calculation unit configured to calculate, for each pixel for distance calculation, distance information on the pixel on the basis of a local area in the first image including the pixel and a local area in the second image corresponding to the local area in the first image; a second calculation unit configured to calculate a non-similarity between the local area in the first image and the local area in the second image; a determination unit configured to determine whether the non-similarity is equal to or higher than a threshold; and a third calculation unit configured to calculate a ratio of the number of local areas for which the non-similarity is determined to be equal to or higher than the threshold in a predetermined area to the number of local areas in the predetermined area.

A second aspect of the present invention is a distance measurement method for calculating distance information based at least on a first image and a second image, the method comprising: a first calculation step of calculating, for each pixel for distance calculation, distance information on the pixel on the basis of a local area in the first image including the pixel and a local area in the second image corresponding to the local area in the first image; a second calculation step of calculating a non-similarity between the local area in the first image and the local area in the second image; a determination step of determining whether the non-similarity is equal to or higher than a threshold; and a third calculation step of calculating a ratio of the number of local areas for which the non-similarity is determined to be equal to or higher than the threshold in a predetermined area to the number of local areas in the predetermined area.

An aspect of the present invention enables determination of whether the distance estimation has been correctly performed by detecting in a distance image a local area for which distances are not successfully correctly estimated and detecting the proportion (ratio) of such an area.

Further features of the present invention will become apparent from the following description of exemplary embodiments with reference to the attached drawings.

DESCRIPTION OF THE EMBODIMENTS

Embodiment 1

<System Configuration>

Figure 1:
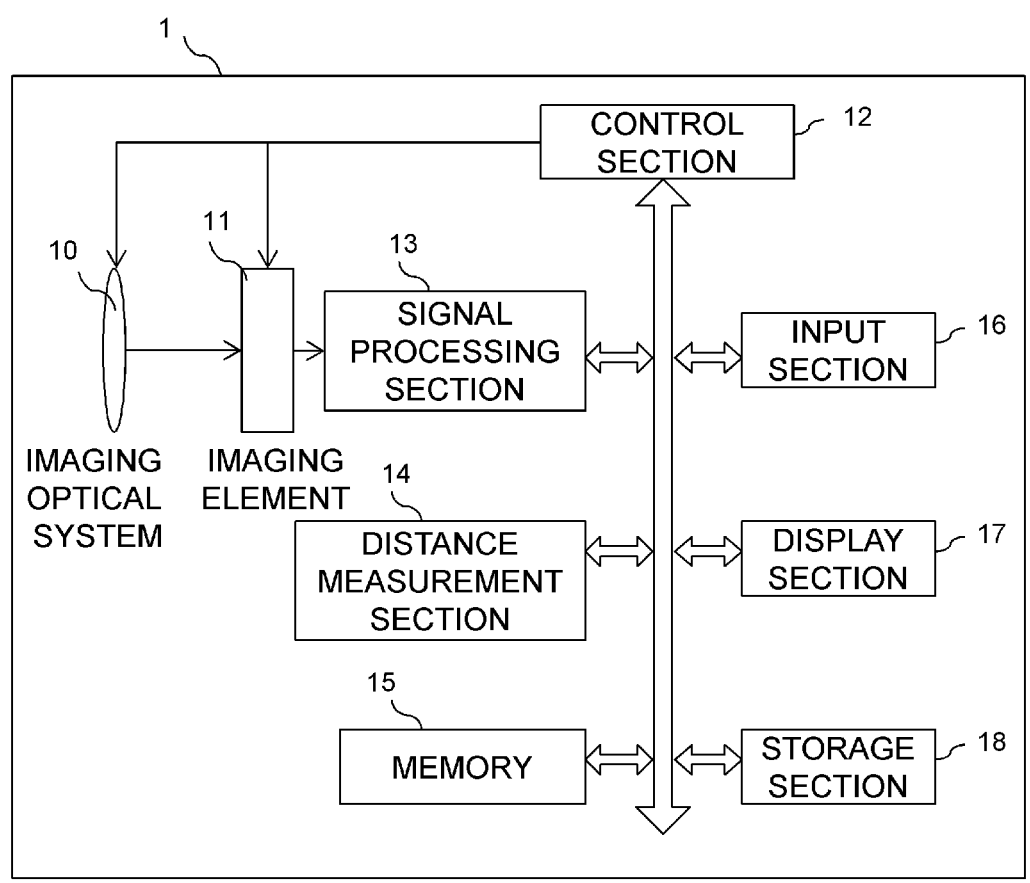
FIG. 1 is a diagram depicting a configuration of an imaging apparatus according to a first embodiment.

FIG. 1 is a diagram depicting a system configuration of an imaging apparatus according to a first embodiment of the present invention. The imaging apparatus 1 has an imaging optical system 10, imaging element 11, a control section 12, a signal processing section 13, a distance measurement section 14, a memory 15, an input section 16, a display section 17, and a storage section 18.

The imaging optical system 10 is an optical system including a plurality of lenses to form incident light into an image on an image surface of the imaging element 11. The imaging optical system 10 according to the first embodiment is an optical system with a variable focus. Automatic focusing can be performed on the imaging optical system 10 using an autofocus function of the control section 12. A scheme for autofocus may be passive or active.

The imaging element 11 is an imaging element using a photoelectric conversion element such as a CCD or a CMOS. The imaging element 11 may be an imaging element with a color filter, a monochromatic imaging element, or a 3 CCD imaging element.

The control section 12 has functions to control the sections of the imaging apparatus 1. The functions of the control section 12 include, for example, automatic focusing based on autofocus (AF), a change in focus position, a change in an F value (aperture value), loading of an image, control of a shutter and a flashbulb (not depicted in the drawings), and control of the input section 16, the display section 17, and the storage section 18.

The signal processing section 13 is means for processing signals output by the imaging element 11. Specifically, the signal processing section 13 performs A/D conversion and noise removal on analog signals, demosaicing, brightness signal conversion, aberration correction, white balance adjustment, color correction, alignment between images, and the like. The process of aligning images may use a technique for detecting, by means of scanning, a local area in one of two images and a corresponding local area in the other image, a technique for performing a coordinate transformation (Affine transformation) on the entirety of one of the images, or the like. Digital image data output by the signal processing section 13 are temporarily accumulated in the memory 15 and output to allow desired processing to be executed; the digital image data are output, for example, to the display section 17 for display, to the storage section 18 for recording (saving), and to the distance measurement section 14.

Figure 2:
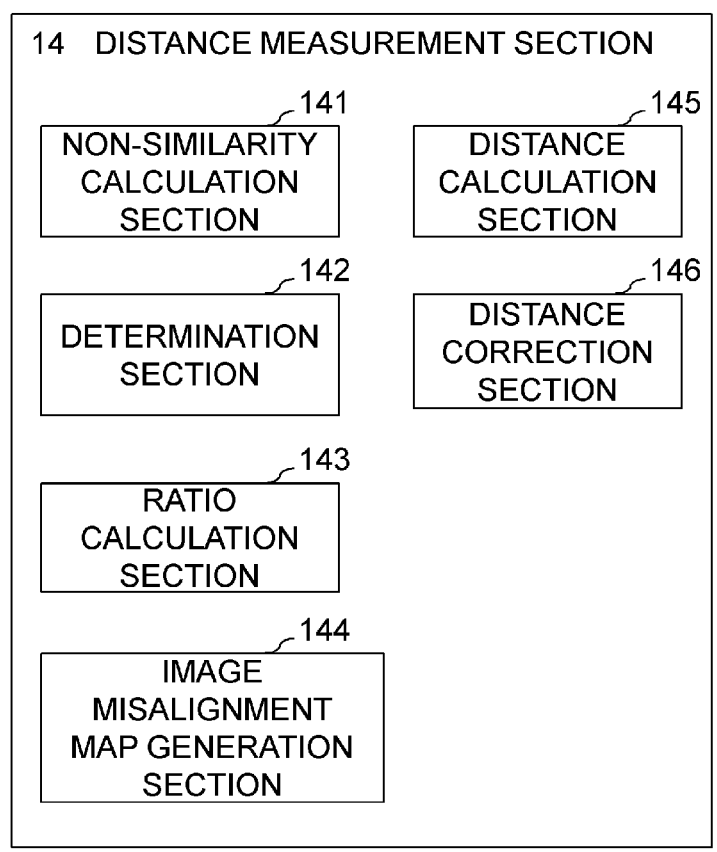
FIG. 2 is a detailed functional block diagram of a distance measurement section in the first embodiment.

The distance measurement section 14 is a functional section that calculates a distance to an object in an image in a depth direction. As depicted in FIG. 2, the distance measurement section 14 includes non-similarity calculation section 141, determination section 142, ratio calculation section 143, image misalignment map generation section 144, distance calculation section 145, and a distance correction section 146. The operation of each of the functional sections will be described below in detail.

The input section 16 is an interface operated by a user to input information to the imaging apparatus 1 and change settings for the imaging apparatus. For example, a dial, a button, a switch, and a touch panel may be utilized.

The display section 17 is a display means including a liquid crystal display, an organic EL display, or the like. The display section 17 is utilized, for example, to check a composition at the time of image capturing, to browse captured or recorded images, or to display various setting screens and message information.

The storage section 18 is a nonvolatile storage medium in which data on captured images, parameter data used for the imaging apparatus 1, and the like are stored. The storage section 18 is preferably a storage medium, to and from which data can be written and read rapidly and which has a large capacity. For example, a flash memory may preferably be used.

<Method for Measuring Object Distance>

Figure 3:
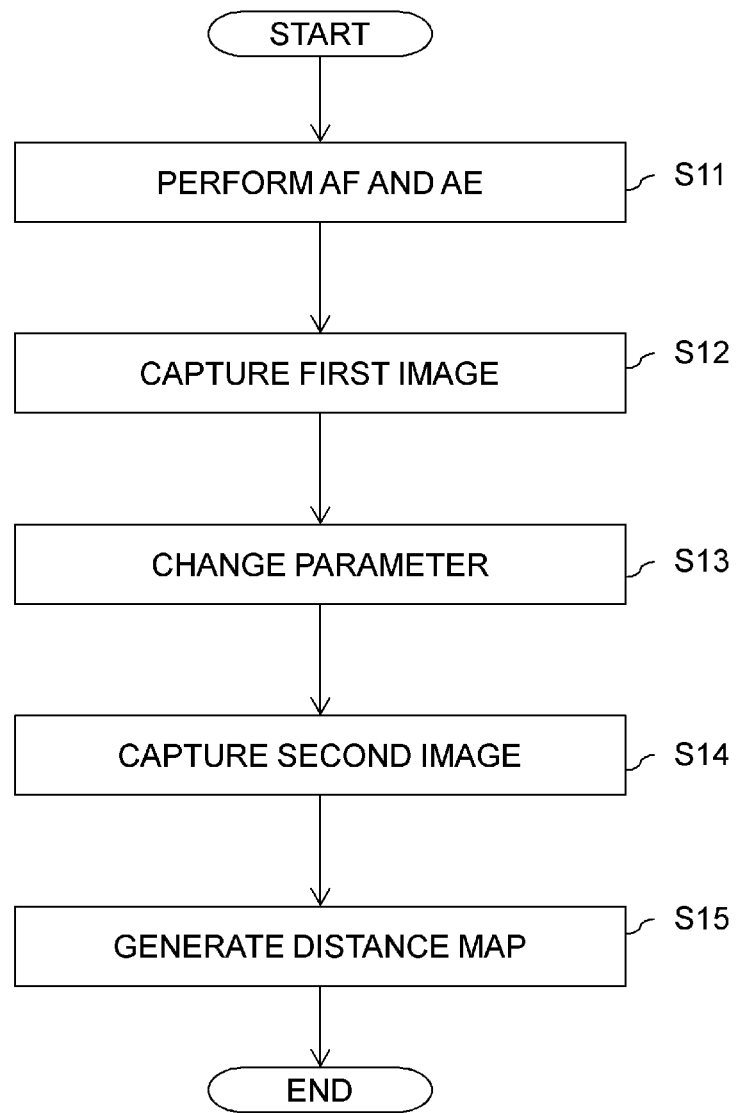
FIG. 3 is a flowchart depicting a flow of a distance measurement process in the first embodiment.

Now, a distance measurement process executed by the imaging apparatus 1 will be described in detail with reference to a flowchart in FIG. 3. The distance measuring method according to the first embodiment will be described in detail in conjunction with the use of the DFD method. In the DFD method, distances are calculated based on a plurality of images captured at different points in time with image capturing parameters changed.

When the user operates the input section 16 to give an instruction to perform distance measurement to start image capturing, the control section 12 performs autofocus (AF) and automatic exposure control (AE) to determine a focus position and an aperture value (F number) (step S11). Subsequently, in step S12, the first image is captured and loaded from the imaging element 11. In the above description, the imaging apparatus 1 automatically determines the image capturing parameters such as the focus position and the aperture value. However, some or all of the image capturing parameters may be specified by the user.

When capturing of the first image is complete, the control section 12 changes any of the image capturing parameters (step S13). The image capturing parameters to be changed are at least one of the aperture value (F number), the focus portion, and the focal length. The image capturing parameters may be changed in accordance with a predetermined method or based on information input by the user via the input section 16. When changes in image capturing parameters are complete, the process shifts to step S14 to take the second image.

In the first embodiment, the second image is captured with the focus position changed. For example, the first image is captured in accordance with autofocus so as to allow a main object to be focused on. The second image is captured with the focus position pre-changed by a specified amount so as to blur the main object.

In this regard, desirably, shutter speed is increased and image capturing intervals are reduced for accurate distance measurement. This is because the adverse effect of camera shake or object shake decreases with increasing shutter speed and decreasing image capturing intervals. However, when sensitivity is increased in order to increase the shutter speed, the adverse effect of noise may be more serious than the adverse effect of camera shake, and thus, the appropriate shutter speed needs to be set in view of sensitivity.

When the two images are captured, the captured images are each processed by the signal processing section so as to be suitable for distance measurement and temporarily accumulated in the memory 15. Specifically, an edge emphasis process and the like need to be avoided so as to prevent blur from being changed during signal processing. Furthermore, an image utilized for subsequent processing may be a brightness image resulting from signal processing or an image of at least one color of an R, G, and B image. At this time, at least one of the captured images may be subjected to signal processing into an image for appreciation, which may then be accumulated in the memory 15.

The two captured images are consecutively captured at high speed and are approximately aligned with each other. However, since the two images are captured at different points in time, the images do not perfectly match each other and may be determined to be misaligned with each other if local areas with the same coordinate position are set in the respective images. Furthermore, movement of the object may result in misalignment or occlusion of the object. To avoid misalignment caused by camera shake or the like wherever possible, the signal processing section 13 preferably executes a process of aligning the images with each other and performs distance measurement using the aligned images. The alignment adopted may be a method of determining, for each local area, an area in the other image which corresponds to the local area by performing a search, or a technique for executing a coordinate conversion (Affine conversion) on the entirety of one of the images. However, completely eliminating misalignment is difficult even when alignment is performed. Additionally, an occlusion area has no matching place, and it is thus impossible to deal with the occlusion area by the alignment process. Hence, for an area with residual misalignment or occlusion, an error occurs in the calculated distance.

In step S15, the distance measurement section 14 calculates a distance map based on the two images for distance measurement accumulated in the memory 15. The distance map is data indicative of the distribution of object distances in the image. The calculated distribution of the object distances is saved to a recording section 19. In addition, the distribution may be displayed through the display section 17 when needed.

Figure 4:
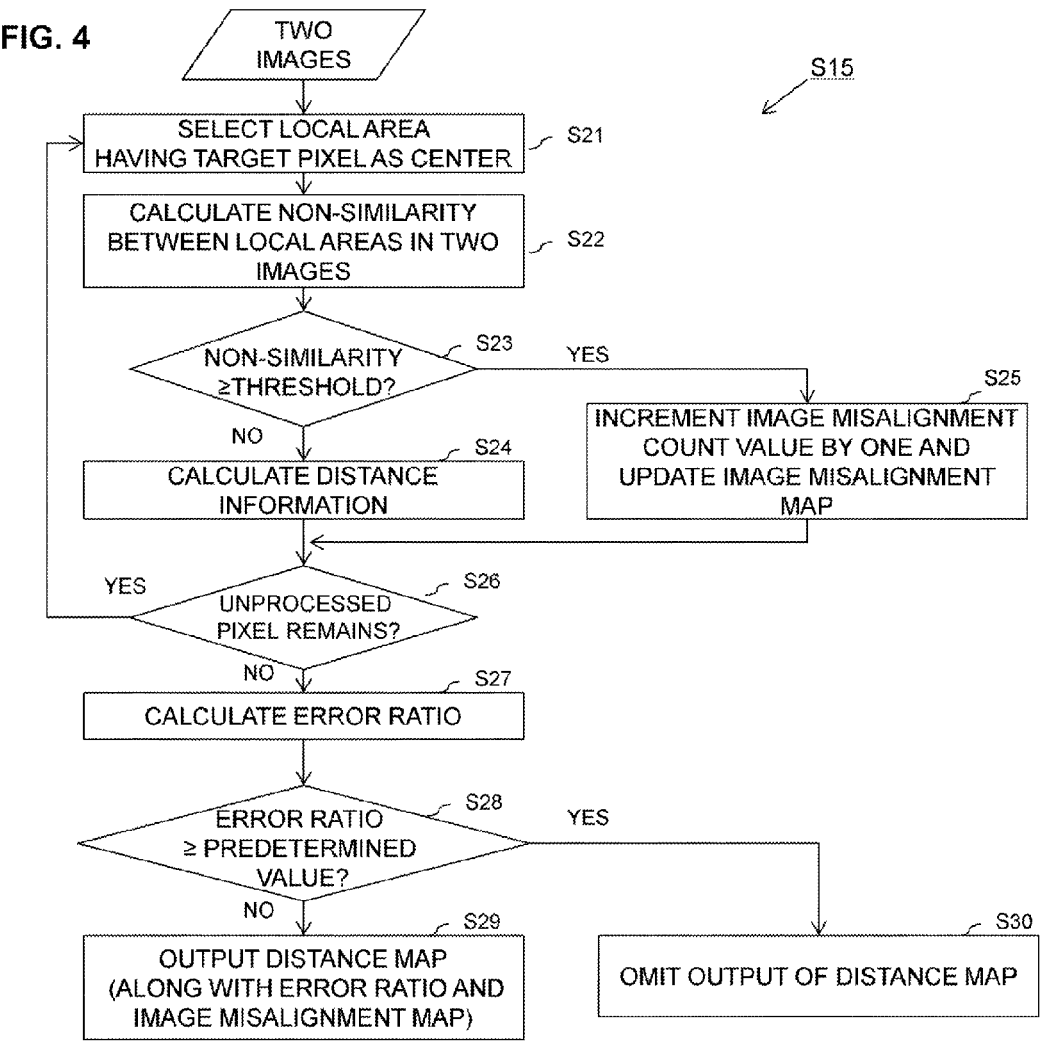
FIG. 4 is a diagram depicting a flow of a distance map generation process in the first embodiment.

Now, processing (hereinafter referred to as a distance map generation process) executed by the distance measurement section 14 in step S15 will be described with reference to FIG. 2 and FIG. 4. FIG. 2 is a functional block diagram of the distance measurement section 14. FIG. 4 is a flowchart depicting a flow of a distance map generation process in the first embodiment.

Upon receiving two images (a first image and a second image) with different focus positions, the distance measurement section 14 selects corresponding local areas in the input two areas in an area selecting step S21. Specifically, for the input two images, local areas around pixels with the same coordinates are extracted from the first image and the second image, respectively. Since the two images have been aligned with each other, the pixels with the same coordinates in the two images are expected to express the same object. In addition, the area around the pixel is extracted because when, the distance for the pixel is estimated, it is difficult to calculate a change in blur by comparison of one pixel on the coordinates of the two images and because the area around the pixel is thus utilized to detect the change in blur.

A distance image (distance map) for the entire input image can be calculated by displacing the target pixel one by one while repeatedly executing the area selection process in step S21 and the subsequent processing in steps S22 to S25. However, the distance map need not necessarily be calculated for the entire input image. A part of the input image is preferably used as a distance calculation target area. For example, the distance is preferably calculated at intervals of a number of pixels for the input image or calculated only for a partial area of the input image. The resolution of the distance map, for which area the distance is calculated, and the like may be specified by the user via the input section 16.

In a non-similarity calculating step S22, the non-similarity calculation section 141 calculates the non-similarity between the local areas in the first image and the second image selected in the area selecting step S21 in order to determine to what degree the local areas match each other. Various techniques may be used to calculate the non-similarity. In the first embodiment, an example utilizing a difference in brightness will be described. When the input image is a brightness image or a monochromatic image, as the non-similarity d between the local areas, a value can be calculated by normalizing the sum of brightness differences between the local areas for the respective pixels using the sum of brightness differences between the local areas for each pixel as expressed by Equation 1. This calculation utilizes a variation in brightness among the pixels resulting from misalignment between the images caused by a moving object or camera shake, leading to an increased non-similarity. The increased non-similarity d means that the local areas are dissimilar.

[Math. 1]

$$d = \frac{\sum |I_{1,i} - I_{2,i}|}{\sum I_{1,i}} \quad \text{(Equation 1)}$$

Here, the brightness of the image of a local area in the first image at a pixel position i is denoted by and the brightness of the image of the corresponding local area in the second image at the pixel position i is denoted by $I_{2,i}$. A target for the total sum is the pixels in the local area.

Now, in a non-similarity determining step S23, the determination section 142 determines whether or not the non-similarity d is equal to or higher than a threshold α. That is, the determination section 142 computationally produces the following determination result for the target pixel.

[Math. 2]

$$f = \begin{cases} \text{false} & (d \geq \alpha) \\ \text{true} & (d < \alpha) \end{cases} \quad \text{(Equation 2)}$$

Here, the threshold α is a value at (or above) which accurate calculation of the distance is assumed to be impossible because an excessively significant difference is present between the local areas in the first and second areas; accurate calculation of the distance is impossible when the non-similarity d is equal to or higher than the threshold α. A specific value for the threshold α may be appropriately set in accordance with a needed distance calculation accuracy.

For simplification of description, the expression "image misalignment occurs at a certain pixel or pixel position" is hereinafter used. To be more exact, the image misalignment means that the images of the corresponding local areas in the two images are misaligned (have a low similarity).

The example using the difference in brightness has been described. However, when the input image is a color image, besides the difference in brightness, the sum of color differences between the local areas for the respective images, that is, a distance on a color space, can be used as the non-similarity d as in Equation 3 and Equation 4

[Math. 3]

$$d=\Sigma(|L_{1,i}-L_{2,i}|+|a_{1,i}-a_{2,i}|+|b_{1,i}-b_{2,i}|) \quad \text{(Equation 3)}$$

[Math. 4]

$$d=\Sigma((L_{1,i}-L_{2,i})^2+(a_{1,i}-a_{2,i})^2+(b_{1,i}-b_{2,i})^2) \quad \text{(Equation 4)}$$

Here, dimensions in an Lab color space are denoted by L, a, and b. However, the Lab color space need not necessarily be used. When the sum of the color differences in the local areas is equal to or larger than the threshold, it is possible to determine that image misalignment is occurring. Like the subscript of I in Equation 1, the subscript i means the pixel position i in the image of the local area in the first image and in the image of the local area in the second image.

When step S23 determines that the non-similarity is higher than the threshold, that is, that image misalignment is present (S23—YES), distance calculation is not executed for the selected image according to the first embodiment. This is because the image misalignment prevents accurate calculation of the distance. In this case, a count value (initial value: 0) indicative of the number of pixels where image misalignment is present is incremented by one (S25). Furthermore, the image misalignment map generation section 144 updates an image misalignment map. The image misalignment map is a binary map indicating whether or not image misalignment is occurring at each pixel. The value of a pixel with image misalignment is set to, for example, 1. The value of a pixel without image misalignment is set to, for example, 0. The image misalignment map may be generated such that all the pixel values are initially set to 0 (no image misalignment) and such that the pixel value is updated to 1 for pixels determined to undergo image misalignment.

When step S23 determines that the non-similarity between the local areas is lower than the threshold, that is, that the pixel of interest undergoes no image misalignment (S23—NO), the process proceeds to step S24, where the distance calculation section 145 executes a distance calculation. The distance calculation section 145 uses the extracted local areas in the first image and the second image to calculate a correlation value NCCi in accordance with Equation 5 to determine the distance. The mean value of the brightness of the pixels in the local area in the first image is denoted by $I_1$. The mean value of the brightness of the pixels in the local area in the second image is denoted by $I_2$.

[Math. 5]

$$NCC_i = \frac{\sum (I_{1,i} - I_1)(I_{2,i} - I_2)}{\sqrt{\sum (I_{1,i} - I_1)^2 \sum (I_{2,i} - I_2)^2}} \quad \text{(Equation 5)}$$

If no aberration is present and the manner of blurring as a result of defocusing is the same between a position forward of the focus and a position rearward of the focus, when the focus is moved and an image is captured with the resultant focus, then the blue is equivalent at a position midway between the two foci. At that position, the correlation has the largest value. As the distance from this intermediate position increases, the manner of blurring varies between the two images to reduce the correlation value. In other words, the correlation is lower at a position more forward or rearward away from the position with the same blur, corresponding to a peak. The correlation value varies in accordance with the blur resulting from defocusing. Thus, knowing the correlation value allows the corresponding amount of defocusing to be determined, enabling the relative distance on the image side to be calculated.

The distance map may include any distance information as long as the information relates to the distance to the object. For example, the distance map may include the obtained correlation value as distance information without any change or include a position relative to the focus position on the image surface into which the correlation value is converted, as distance information. In this regard, the correlation value and the relative position from the focus position on the image surface differ from each other due to the F number. Thus, a conversion table is provided for each F number so as to allow a conversion into a relative distance from the focus position on the image surface. Moreover, the obtained relative distance may be converted into an object distance using the focal length and the focus distance on an object side. The object distance may be adopted as distance information to be included in the distance map.

The example in which distances are calculated using the correlation value has been described. However, any other method may be used as the DFD method. For example, a technique may be used in which a change in blur between images is calculated by converting local images into frequency spaces and determining the ratio between the frequency spaces as in Equation 6.

[Math. 6]

$$\frac{F\{I_2\}}{F\{I_1\}} = \frac{F\{PSF_2 \otimes s\}}{F\{PSF_1 \otimes s\}} = \frac{OTF_2 \cdot S}{OTF_1 \cdot S} = \frac{OTF_2}{OTF_1} = OTFr \quad \text{(Equation 6)}$$

Here, a Fourier transform is denoted by F, an image with no blur is denoted by s, and an image corresponding to a frequency space into which the image s is converted is denoted by S. A point spread function for each local area is denoted by PSF, and an optical transfer function is denoted by OTF. Furthermore, a relative OTF between two images is denoted by OTFr and allows distances to be determined.

The present invention is not intended to limit the specific aspect of the DFD method used for distance measurement. For example, a method different from the above-described methods is available which involves generating an all-in-focus image, applying blur varying according to the distance to the all-in-focus image, and determining the difference between the all-in-focus image and the captured image to output the distance corresponding to the blur obtained when the difference is smallest.

As described above, processing for one pixel (one pair of local area) is complete. The distance measurement section 14 determines whether any unprocessed pixel remains in a distance calculation target area (S26). When an unprocessed image remains (S26—YES), the target pixel is changed, and the process returns to step S21 to select local areas. When the processing in steps S21 to S25 is complete for all the pixels to be processed (S26—NO), the process shifts to step S27.

In step S27, the ratio calculation section 143 calculates the ratio (error ratio) of the number of pixels at (the number of local areas in) which image misalignment has occurred to the number of pixels (local areas) in the entire distance map. Specifically, the ratio calculation section 143 calculates the ratio of the number of pixels determined to have a non-similarity higher than the threshold to the number of pixels for which the non-similarity is to be calculated. The calculation may use the count value of the number of pixels undergoing image misalignment and determined in step S25, or an image misalignment map.

In the first embodiment, when the calculated error ratio is lower than a predetermined value (for example, 10%) (S28—NO), the distance map calculated by the distance calculation section 145 is output (S29). In this case, for distance information on a pixel for which the distance has not been calculated, a set particular value may be output or distance information on another pixel positioned around the pixel for which the distance has not been calculated may be directly output. Alternatively, the distance information on the pixel for which the distance has not been calculated may be calculated by interpolating the distance information on the pixel around the pixel for which the distance has not been calculated. Alternatively, in step S29, one or both of the error ratio image and the misalignment map may be output along with the distance map.

On the other hand, when the calculated error ratio is equal to or higher than a predetermined value (S28—YES), the distance map calculated by the distance calculation section 145 is not output (S30). In this case, a signal indicating that the distance map has failed to be output may be output or the error ratio may be output. This is because a high error ratio indicates that the distance has not been calculated for many areas due to image misalignment resulting from a moving object, residual camera shake, or the like. The use of the error ratio enables easy determination of whether to execute a process utilizing the distance map. Furthermore, an image misalignment map may be output instead of or in addition to the error ratio. Additionally, a failure to output the distance map may be displayed on the display apparatus and thus reported to the user.

Furthermore, in step S25, the binary image misalignment map indicating whether image misalignment has occurred is generated. Thus, in addition to the error ratio, an error portion can be identified. The utilization of the image misalignment map enables the distance map to be corrected. For example, when the error ratio is low, the distance correction section 146 may utilize the image misalignment map to correct the distance information on the error position to output the distance map. Correction of the distance information may be executed by performing interpolation using a distance image around the error position. Additionally, the alignment process may be executed again before the distance information is output. That is, a method is possible which involves re-searching the second image for a local area corresponding to the local area in the first image and then calculating the distance information on the local area again. Preferably, which method is used to calculate the distance information is determined depending on the density of pixels undergoing image misalignment.

The first embodiment is effective for enabling, when image misalignment between two images is caused by a moving object or camera shake, the output of the rate of errors in the distance map and at which positions the errors are present. Moreover, the first embodiment is also effective for enabling, using the above-described information, easy determination of whether to execute a process using the distance map or whether to correct the distance map.

In the above description, the output of the distance map is omitted when the error ratio is high. However, the distance map may be output regardless of the magnitude of the error ratio. In this case, the value of the error ratio is preferably output along with the distance map. The output of the distance map along with the error ratio enables determination of whether an application that receives the distance map executes a process using the distance map. Furthermore, in addition to or instead of the error ratio, the image misalignment map may be output along with the distance map. This enables determination of how the application that receives the distance map executes processing based on the image misalignment map.

Embodiment 2

Now, a second embodiment of the present invention will be described. The second embodiment differs from the first embodiment in that, in the distance measurement based on the DFD method, the image capturing parameter to be changed is not the focus position but the F number and in that, besides the distance measurement, determination for image misalignment is performed. A configuration of an imaging apparatus according to the second embodiment is basically identical to the configuration in Embodiment 1 (FIG. 1 and FIG. 2). The main difference is that a distance measurement section 14 performs detection of image misalignment before distance calculation rather than simultaneously performing the detection of image misalignment and the distance calculation.

Figure 5:
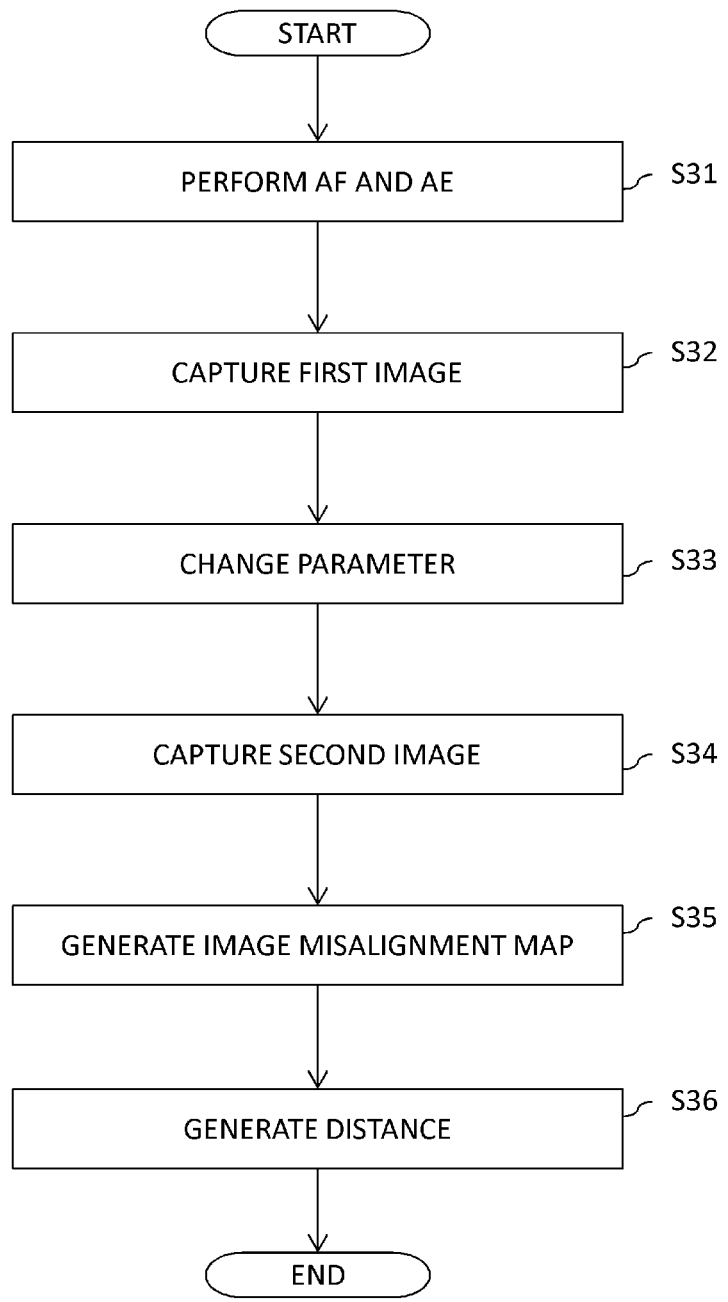
FIG. 5 is a flowchart depicting a flow of a distance measurement process in the second embodiment.

The difference in processing from the first embodiment will be described below. FIG. 5 is a flowchart depicting a flow from image capturing to an image misalignment determination process and a distance map generation process in the second embodiment.

Processing in steps S31 to S34 is basically the same as the processing in steps S11 to S14 in the first embodiment. However, in the second embodiment, when the image capturing parameter is changed in steps 33, the F number is changed. That is, executing step S34 results in acquisition of two images with different F numbers. Then, based on the thus captured two images, a pixel misalignment determination process is executed (S35) to generate an image misalignment map, and then, a distance calculation process (S36) is executed to generate a distance map.

Figure 6:
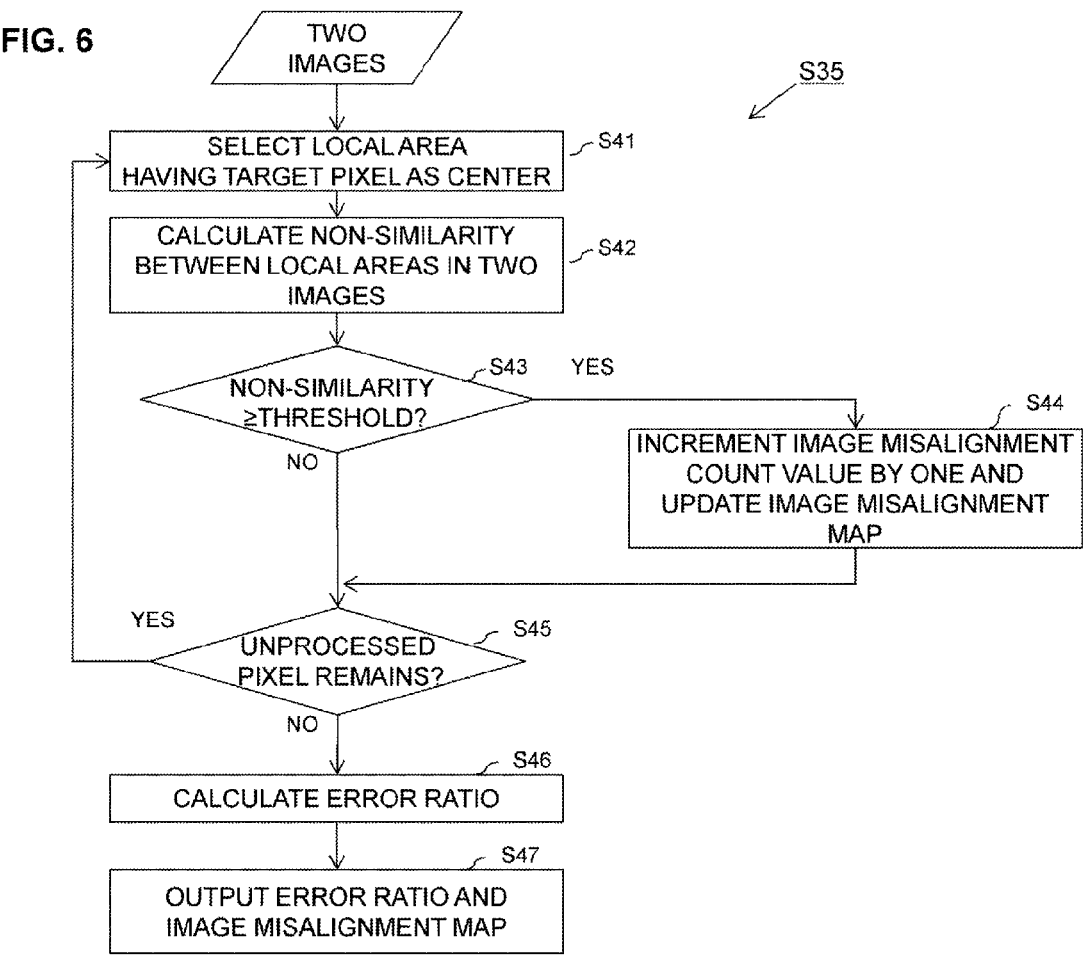
FIG. 6 is a diagram depicting an image misalignment determination process in the second embodiment.

Now, the pixel misalignment determination process in step S35 will be described in further detail. FIG. 6 is a flowchart depicting the flow of the pixel misalignment determination process in the second embodiment.

In step S41, corresponding local areas are set in two images input as is the case with step S21, and the respective local area images are then extracted. To allow determination for image misalignment for the entire image, the local area is selected by displacing the target pixel one by one.

In step S42, in order to determine image misalignment between the local areas extracted in step S41, a non-similarity calculation section 141 calculates the non-similarity between the local areas in the two images as is the case with step S22. As a specific non-similarity, the non-similarity described in the first embodiment can be adopted. In step S43, a determination section 142 determines whether the non-similarity calculated in step S42 is equal to or higher than a threshold. The non-similarity being equal to or higher than the threshold indicates that misalignment has occurred at the target pixel. At this time, in step S44, an image misalignment count value indicative of a pixel undergoing image misalignment is incremented by one, or the pixel value of that pixel in the image misalignment map is set to 1 to update the image misalignment map.

As described above, processing for one pixel is complete. When an unprocessed pixel remains (S45—YES), the processing target pixel is changed, and the process returns to step S41 to select local areas. When the processing in steps S41 to S44 is complete for all the processing target pixels (S45—NO), the process shifts to step S46.

In step S46, a ratio calculation section 143 calculates the ratio (error ratio) of the number of pixels at (the number of local areas in) which image misalignment has occurred to the number of pixels (local areas) included in a distance calculation target area. In step S47, the error ratio and the image misalignment map are output.

Then, the process shifts to a distance map generation process (step S36). However, at this point, whether generation of a distance map is halted may be determined based on the error ratio. For example, when the error ratio is equal to or higher than a predetermined value, the generation of the distance map may be halted. Alternatively, it may be possible to determine to, for example, re-execute an alignment process when the error ratio is equal to or higher than the predetermined value. Preferably, when the alignment process is re-executed, the image misalignment determination process is subsequently executed again.

Figure 7:
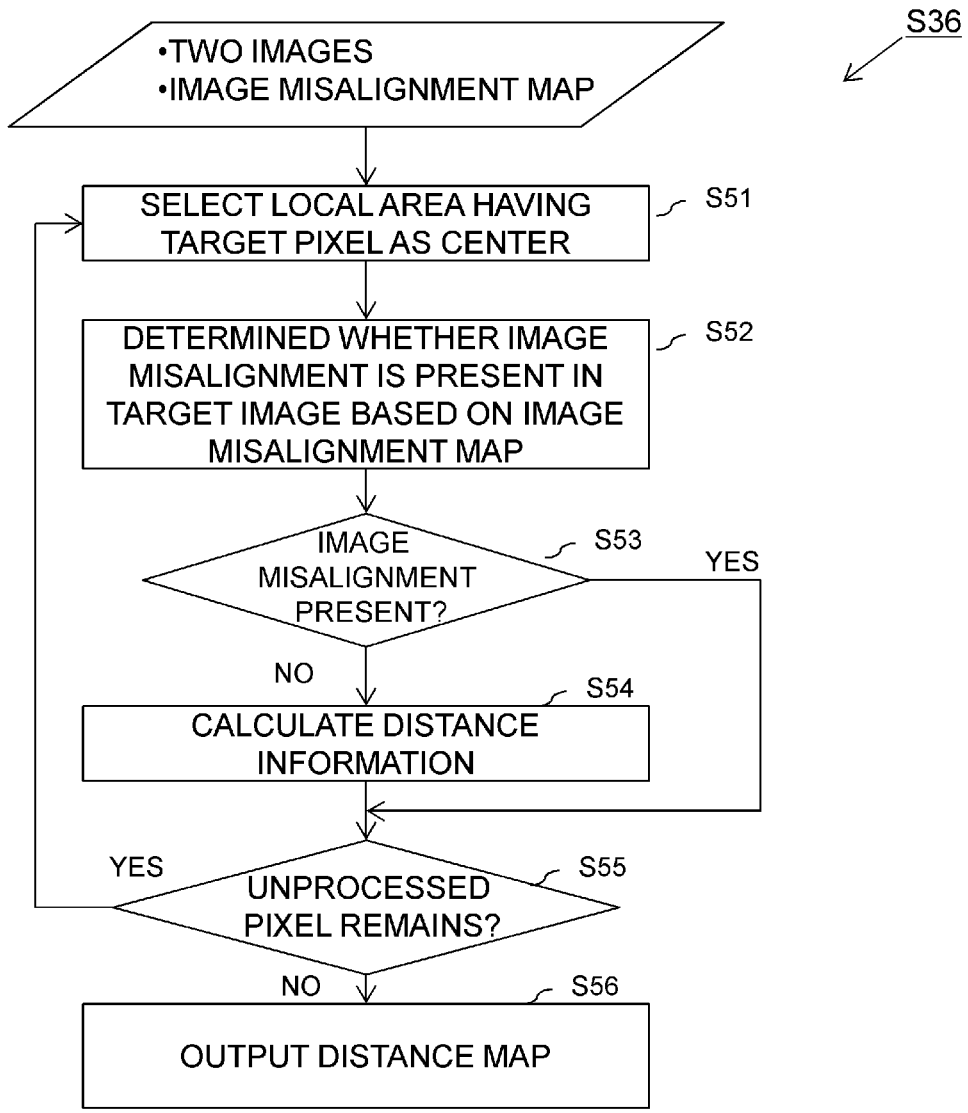
FIG. 7 is a diagram depicting a flow of a distance map generation process in the second embodiment.

Now, a distance map generation process will be described. FIG. 7 is a flowchart depicting the flow of the distance map generation process in the second embodiment. The distance map generation process receives two captured images and the image misalignment map obtained in the image misalignment determination process.

Processing in step S51 is similar to the processing in step S21 and will thus not be described below. Step S52 determines whether image misalignment is occurring at the pixel position selected in step S51 based on the image misalignment map. The presence of image misalignment can be determined since the corresponding pixel in the image misalignment map has been set to a value indicating the presence of image misalignment. When image misalignment has occurred at the pixel (S53—YES), no distance calculation is executed for the pixel. On the other hand, when no image misalignment is present (S53—NO), the process proceeds to step S54 to execute a distance calculation for the pixel. The distance calculation process in step S54 is similar to the distance calculation process in step 24 and will thus not be described below.

The above-described processing is repeated for all the pixels intended for the distance calculation to complete a distance map. At this time, for pixels for which distance information has not been calculated, the distance information may be determined based on distance information on peripheral pixels by means of interpolation or the distance information may be re-calculated after the alignment process is executed again, as is the case with the first embodiment. Alternatively, the image misalignment map may be output along with the distance map so as to allow an application that receives the distance map to determine what process to execute.

According to the second embodiment, the misalignment determination process is executed before the distance measurement. This enables, for example, determination of whether to perform the distance measurement or determination to perform alignment again before the distance measurement.

Embodiment 3

A third embodiment of the present invention is an embodiment added with determination of whether image misalignment is occurring particularly in a region of interest. A configuration of an imaging apparatus in the third embodiment is similar to the configuration in the first and second embodiments.

Figure 8:
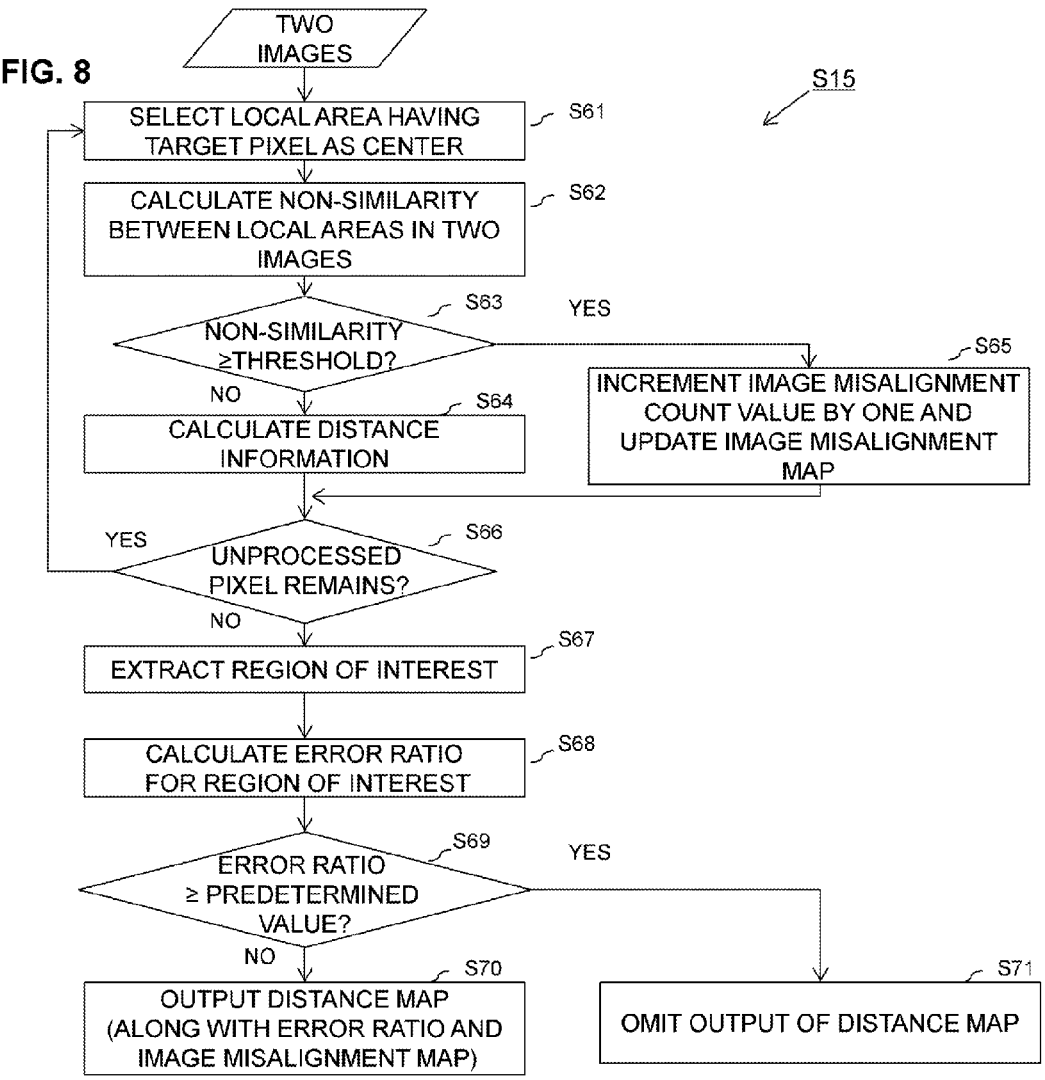
FIG. 8 is a diagram depicting a flow of an image misalignment determination process in a third embodiment.

Differences in processing from the first embodiment will be described below. FIG. 8 is a flowchart depicting a flow of a pixel misalignment determination process in the third embodiment.

Processing in steps S61 to S66 in the first embodiment is similar to the processing in steps S21 to S26 and will thus not be described below. The processing in steps S61 to S66 completes calculation of distance information and determination of whether or not image misalignment is present, for all the pixels.

In step S66, a region of interest in which a photographer and an observer are interested is extracted from the images. This region-of-interest extraction process may be executed by a signal processing section 13. Various methods have been proposed for extraction of the region of interest. Here several typical methods will be described.

Figure 9A:
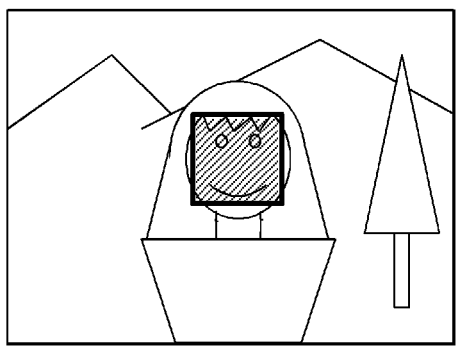
FIGS. 9A to 9D are diagrams depicting a face area extracted as a region of interest in the third embodiment.
Figure 9B:
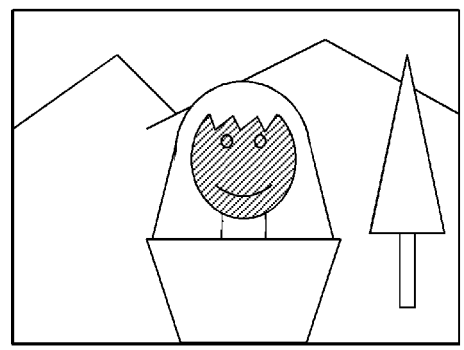
Figure 9C:
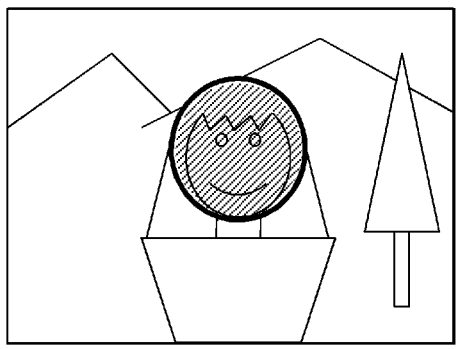
Figure 9D:
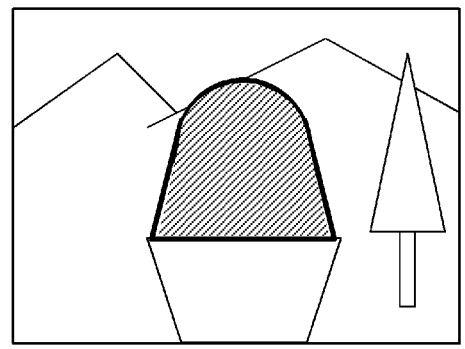

First, in a method, a face area is extracted as the region of interest. The extraction of the face area is effective as the extraction of the region of interest because the object of image capturing is a person in many cases. In a specific detection method, the signal processing section 13 detects a face area in the image as depicted in FIG. 9A using a matching method that uses learning data as provided in an imaging apparatus such as a digital camera. An image used for face detection may be any of a plurality of images. However, preferably, an image focused by autofocus is used. To allow the face area to be more accurately detected, a flesh-colored area near a face area (the flesh-colored area in and near the face area) detected as depicted in FIG. 9B may be detected as a face area, with the width and height of the face area and a detection area saved. In this case, the face area may include the neck. Moreover, the face area may be an elliptic area including a head area as depicted in FIG. 9C. Alternatively, a hair area may be detected based on the color of hair from the vicinity of the face area as depicted in FIG. 9D so that a combination of the hair area and the face area is entirely extracted as a face area. Moreover, a personas a whole may be detected based on a human body model, or the like, with reference to the face area, whereby a person area may be extracted as the region of interest.

When the object is other than a person, an area considered to be the region of interest may be an area where AF has been performed. In this case, a distance measurement area used for AF is extracted as the region of interest. Furthermore, when the input image is two images with different focus positions, the contrasts of the two images may be detected so that the extracted region of interest is an area where the contrast of the image undergoing AF is higher than the contrast of the other image by at least a predetermined amount.

Using the region of interest thus extracted from the images, a binary region-of-interest map (for example, the region of interest has a pixel value of 1, and the other areas have a pixel value of 0) is generated and output.

In step S68, a ratio calculation section 143 calculates the error ratio using the image misalignment map generated in step S65 and the region-of-interest map generated in step S67. The ratio calculation section 143 calculates, as the error ratio, the ratio of the number of pixels in the region of interest which undergo image misalignment to the number of pixels in the entire region of interest. That is, the ratio calculation section 143 calculates as the error ratio the ratio of the number of pixels (local areas) in the region of interest which are determined to have a non-similarity equal to or higher than a threshold in step S62 to the number of pixels (local areas) in the region of interest. That is, in the third embodiment, the error ratio in a predetermined area is calculated with the region of interest defined as the predetermined area.

Then, when the thus calculated error ratio is lower than a predetermined value (for example, 10%) (S69—NO), the distance map calculated by the distance calculation section 145 is output (S70). At this time, preferably, the error ratio and the image misalignment map are also output. Furthermore, for pixels undergoing image misalignment based on the image misalignment map, the distance information may be determined by means of interpolation or after the alignment process is executed again, as is the case with the first embodiment.

On the other hand, when the error ratio is equal to or higher than a predetermined value (S69—YES), the distance map calculated by the distance calculation section 145 is not output (S71).

In an application that uses the distance map, a distance estimation error occurring in an area of high interest in the image is more noticeable than a distance estimation error in an area of low interest. For example, there may be a process of, for example, generating an image with a small depth of field by using the calculated distance map to apply blur corresponding to the distance. If such a process is executed, when blur is applied to an area such as the face in which people have a great interest, a stronger feeling of strangeness is produced than when blur is applied to an area of low interest.

The third embodiment determines and utilizes the error ratio in the region of interest for the subsequent processing. This is effective for making errors less noticeable.

Furthermore, in the above description, the error ratio is determined with focus placed only in the region of interest. However, the error ratio may also be determined, with image misalignment in areas other than the region of interest taken into account. For example, two error ratios may be calculated: the error ratio for the region of interest and the error ratio for the entire image (the entire image for distance calculation). In this case, for example, a stricter determination condition may be set for the error ratio for the region of interest (for example, 5%) than for the error ratio for the entire image (for example, 10%). Then, when both error ratios are lower than the predetermined value, the distance map is output. Alternatively, a value calculated from the two error ratios (for example, a weighted mean) may be compared with a predetermined value. Such a technique enables the determination to be made in view of both image misalignment in the region of interest and image misalignment in areas other than the region of interest.

In the above description, even when only the error ratio in the region of interest is determined, the non-similarity between local areas is determined for all the areas. In this case, the region of interest may first be extracted so as to allow the non-similarity to be determined only for the region of interest.

Similarly to the first embodiment, in the third embodiment the distance map may be output regardless of the magnitude of the error ratio as is the case with the first embodiment. Furthermore, the third embodiment may be combined with the second embodiment so that the error ratio for the region of interest is first calculated and so that when the error ratio is equal to or lower than a predetermined value, the distance calculation process is started.

<Variations>

The description of the embodiments is illustrative for describing the present invention. The embodiments of the present invention may be appropriately changed or combined without departing from the spirit of the invention. For example, the present invention may be implemented as an imaging apparatus involving at least a part of the above-described processing or as a distance measurement apparatus with no imaging means. Furthermore, the present invention may be implemented as a distance measurement method or as an image processing program allowing a distance measurement apparatus to execute the distance measurement method. These processes and means may be optionally combined together unless the combination leads to technical inconsistency.

Additionally, the element technologies described in the embodiments may be optionally combined together. For example, it is possible to optionally combine the image capturing parameters to be changed, the order of execution of the image misalignment determining steps, the specific aspect of the distance calculation, and the like together for implementation.

In addition, in the embodiments, the example where the error ratio and the image misalignment map are output has been described. However, only the error ratio may be output or only the image misalignment map may be output. Based on the image misalignment map, the error ratio may be calculated and the pixel positions undergoing image misalignment may be determined. Furthermore, the example where the image misalignment map is for a binary image has been described. However, the pixel values in the image misalignment map need not necessarily be binary. For example, the non-similarity between local areas may be adopted as the pixel value in the image misalignment map.

Furthermore, in the embodiments, the example where the imaging apparatus acquires two images has been described. However, three or more images may be acquired. In this case, two of the captured images are selected, and the distance measurement is performed for the selected images. Acquisition of three or more images is effective for increasing the range of possibility of the distance measurement and improving distance accuracy.

Moreover, in the embodiments, the DFD method has been described as a distance calculation method. Alternatively, the DFF method or the stereo method is applicable.

The DFF method is a distance measurement method of capturing a plurality of images with the focus varied, determining an image involving a selected area with the highest contrast to be in focus, and calculating the corresponding focus distance as the distance to the object. In this case, after the plurality of images is aligned with one another, image misalignment with a reference image caused by a moving object or the like may be calculated. Similarly, the error ratio can be calculated.

For the stereo method, the alignment between two images may be performed before distance calculation, and an occlusion area resulting from a moving object or parallax may be similarly calculated as an image misalignment area. This enables generation of an image misalignment map and calculation of the error ratio.

Other Embodiments

The above mentioned distance measurement technique of the present invention can be suitably applied to an imaging apparatus, such as a digital camera and a digital camcorder, or to an image processing apparatus, a computer or the like that performs image processing on image data acquired by an imaging apparatus. The technique of the present invention can also be applied to various electronic apparatuses (including a cellular phone, a smart phone, a slate device, and a personal computer) incorporating the imaging apparatus or the image processing apparatus.

Though the above explanation of the embodiments is made with respect to the imaging apparatus including the distance measurement function, the distance measurement may be performed by an apparatus other than the imaging apparatus. The distance measurement function may be incorporated into a computer that includes an imaging apparatus, so that the computer acquires an image photographed by the imaging apparatus, and the distance is calculated. The function of the distance measurement may be incorporated in a computer accessible to a network by wire or radio. The computer may acquire a plurality of images via the network and perform the distance measurement on the basis of the images.

The obtained distance information can be used for various kinds of image processing such as an area division of an image, generation of a stereoscopic image and a depth image, and emulation of a blur effect.

Note that, as specific implementation on the apparatuses, both of implementation by software (a computer program) and implementation by hardware are possible. For example, various kinds of processing for attaining the object of the present invention may be realized by storing a computer program in a memory of a computer (a microcomputer, an FPGA, etc.) incorporated in the imaging apparatus or the image processing apparatus and causing the computer to execute the computer program. It is also preferable to provide a dedicated processor such as an ASIC that realizes all or a part of the processing of the present invention using a logic circuit.

For this purpose, the program is provided to the computer via a network or from recording media of various types that can serve as the storage device (in other words, a computer-readable recording media that stores data non-transitorily).

Therefore, the computer (including devices such as a CPU and a MPU), the method, the program (including a program code and a program product), and the computer readable recording medium that stores the program non-transitorily are also included in the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022059, filed on Feb. 7, 2014, which is hereby incorporated by reference herein in its entirety.

What is claimed is:

1. A distance measurement apparatus that calculates distance information based at least on a first image and a second image, the distance measurement apparatus comprising:
 a first calculation unit configured to calculate, for each pixel to which distance calculation is performed, distance information corresponding to the pixel on the basis of a local area of a number of local areas in the first image, including the pixel, and a local area of a number of local areas in the second image, corresponding to the local area in the first image;
 a second calculation unit configured to calculate a non-similarity value between the local area in the first image and the local area in the second image;
 a determination unit configured to determine whether the non-similarity value is equal to or greater than a threshold; and
 a third calculation unit configured to calculate a ratio of the number of local areas for which the non-similarity value is determined to be equal to or greater than the threshold in a predetermined area to the number of local areas in the predetermined area.

2. The distance measurement apparatus according to claim 1, wherein, when the ratio is equal to or greater than a predetermined value, no distance information is output.

3. The distance measurement apparatus according to claim 1, wherein the distance information is output along with the ratio.

4. The distance measurement apparatus according to claim 1, wherein the first image and the second image are captured at different image-capturing points in time, using different image capturing parameters.

5. The distance measurement apparatus according to claim 1, wherein the non-similarity value is a value resulting from the normalization of a sum of brightness differences between the local area in the first image and the local area in the second image, for respective pixels.

6. The distance measurement apparatus according to claim 1, wherein the non-similarity value is a sum of color differences between the local area in the first image and the local area in the second image, for respective pixels.

7. The distance measurement apparatus according to claim 1, wherein the predetermined area is equal to a distance calculation target area.

8. The distance measurement apparatus according to claim 1, further comprising a region-of-interest extraction unit configured to extract a region of interest from the first image,
 wherein the predetermined area is equal to the region of interest.

9. The distance measurement apparatus according to claim 8, wherein the third calculation unit is further configured to calculate the ratio, with the region of interest being defined as the predetermined area, and with a distance calculation target area being defined as the predetermined area.

10. The distance measurement apparatus according to claim 8, wherein the region of interest is a face area or a person area.

11. The distance measurement apparatus according to claim 8, wherein the first image is an image captured by performing autofocus, and
the region of interest is an area used for autofocus in the first image.

12. The distance measurement apparatus according to claim 8, wherein
the first image is an image captured by performing autofocus, and
the region of interest is an area for which a contrast in the first image is greater than a contrast in the second image by at least a predetermined amount.

13. The distance measurement apparatus according to claim 1, further comprising a correction unit configured to correct distance information corresponding to the local area for which the non-similarity value is determined to be equal to or greater than the threshold.

14. The distance measurement apparatus according to claim 1, wherein the second image is searched for a different local area of which the corresponding non-similarity value is determined to be equal to or greater than the threshold, and then the distance information corresponding to the different local area is calculated again.

15. An imaging apparatus comprising:
an imaging unit; and
the distance measurement apparatus according to claim 1.

16. A distance measurement method for calculating distance information based at least on a first image and a second image, the method comprising:
a first calculation step of calculating, for each pixel to which distance calculation is performed, distance information corresponding to the pixel on the basis of a local area of a number of local areas in the first image, including the pixel, and a local area of a number of local areas in the second image, corresponding to the local area in the first image;
a second calculation step of calculating a non-similarity value between the local area in the first image and the local area in the second image;
a determination step of determining whether the non-similarity value is equal to or greater than a threshold; and
a third calculation step of calculating a ratio of the number of local areas for which the non-similarity value is determined to be equal to or greater than the threshold in a predetermined area to the number of local areas in the predetermined area.

17. A non-transitory computer readable medium in which a program is stored, the program allowing a computer to execute the steps of the distance measurement method according to claim 16.

* * * * *